May 19, 1970
R. W. KING
3,512,546
BLOCK AND BLEED VALVE SEAT
Filed Oct. 30, 1968
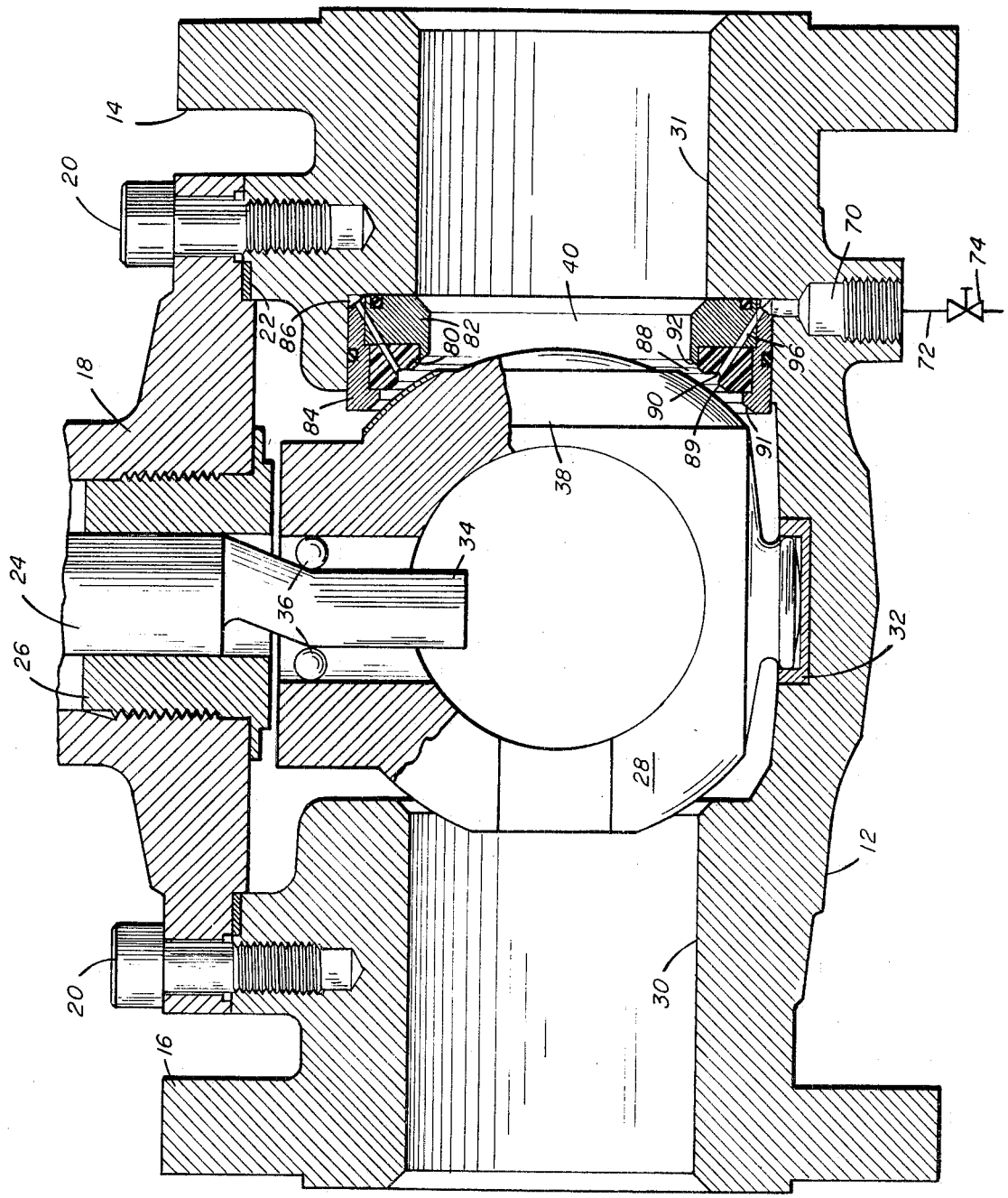
INVENTOR.
RUDY W. KING
BY
*Head & Johnson*
ATTORNEYS

United States Patent Office 3,512,546
Patented May 19, 1970

3,512,546
BLOCK AND BLEED VALVE SEAT
Rudy W. King, Little Rock, Ark., assignor, by mesne assignments, to Orbit Valve Company, a corporation of Arkansas
Continuation-in-part of application Ser. No. 545,146, Apr. 25, 1966. This application Oct. 30, 1968, Ser. No. 771,929
The portion of the term of the patent subsequent to Oct. 21, 1986, has been disclaimed
Int. Cl. F16k 3/26
U.S. Cl. 137—312
2 Claims

ABSTRACT OF THE DISCLOSURE

A block and bleed type valve of the "Orbit" type includes a valve seat composed of material known under the trademark "Bakelite." The valve core, when seated, is in seating and sealing contact with two face portions formed in the material between which a communicating annular groove separates the two faces. A plurality of bleed openings extend from this groove to and in communication with the exterior of the valve.

CROSS-REFERENCE TO RELATED APPLICATIONS

This invention is an improvement over prior U.S. Pat. No. 3,131,906, issued May 5, 1964, and in particular is a continuation-in-part of copending application S.N. 545,146, filed Apr. 25, 1966, and since abandoned, and application S.N. 609,680, filed Jan. 16, 1967.

BACKGROUND OF THE INVENTION

This invention relates to improvements in fluid flow control valves and valve seats for particular utilization in what is known in the art as "block and bleed systems." In particular, this application relates to what is known in the art as "Orbit" type valves such as are best described in prior Pats. 2,076,840; 2,076,841; 2,516,947; and 2,719,022. This type of valve is best described as one wherein the valve core and its seating surface are, in the open position, fully out of contact with the valve seat. Upon rotation of the valve core approximately 90°, the valve core moving mechanism is adapted to thereafter move the core and its seating surface towards the valve seat for contact therewith, closing the valve passageway.

Block and bleed systems have heretofore been utilized to connect differing stored fluids into a common flow line and outlet for dispensing. The problem inherent in many of the prior systems is in the event there is a valve leakage from a particular identified fluid, the outlet flow line often becomes filled with an undesired fluid relative to what is desired to be dispensed by the next user. Hence, unless removed and bled from the system, contamination and intermingling of the fluids would result. For example, such a system is utilized in the dispensing of kerosene, gasoline and naphtha from separate storage containers into a common dispensing outlet. Heretofore, dual spaced valves were positioned between the connection from a particular stored fluid to the common outlet flow line. A valve bleed circuit is connected between the two valves such that when the two valves are closed the bleed valve would be open. In the event of any leakage beyond the first of such closed valves, fluid would not enter the main and common flow outlet but instead would be exhausted through the bleed to storage or waste and hence would not contaminate the common outlet line with possible undesired fluid. However, it was found that this was a costly and involved method requiring numerous valves and numerous operations in the utilization of such a system. Block and bleed valves have been taught, such as in Pat. No. 3,050,077, heretofore, which have been for a particular use in a gate valve of the type wherein the valve core or disc reciprocates across the valve seat and wherein the valve seat comprises dual and separated sealing elements which extend into the path of travel of the valve disc and hence become worn during the travel of the disc.

SUMMARY

This invention overcomes the problems heretofore existing with the prior art devices and systems and provides a single valve and single valve seat with dual sealing faces. The faces are of the material, well known in the art, of Bakelite, and are formed in combination with a two piece metallic ring. The valve seat is formed by spaced seating faces formed within the Bakelite material, each face separated by an annular groove. Provision is further made for interconnecting the annular groove or space between seating faces to the outside of the valve seat and the valve for bleed or other control purposes. Hence, this invention differs over that disclosed in the aforesaid copending applications in that the Bakelite insert seating face is divided annularly by a groove and provides the separate seating faces for use with valves of the "Orbit" type.

BRIEF DESCRIPTION OF THE DRAWING

The figure is a view, partly in cross-section, of a typical valve arrangement, utilizing the valve seat of this invention.

DESCRIPTION OF THE PREFERRED EMBODIMENT

Referring now to the drawing, the figure depicts a valve of the type described herein.

Valve body 12 includes flanged connection members 14 and 16 for interconnection with a conduit within which the valve is to be inserted. Flanges 14 and 16 may be replaced by threaded or weld type connections, not shown, or by any other type of pipe connection devices known in the art to mount the valve within the line.

An upper bonnet 18, shown only partially, is attached to body 12 by a plurality of bolts 20 between which a gasket 22 is positioned to provide a proper seal. Although a bolted connection is shown, it is understood that the upper bonnet may be welded to the body portion 12 or otherwise sealably retained. Bonnet 18 ordinarily extends upwardly and includes provision for a handle or crank (not shown), which serves to operate valve stem 24. The valve stem is positioned within bushing 26 which is threaded or otherwise attached to bonnet 18, as shown. Bushing 26 functions to hold the valve stem 24 in alignment relative to valve core 28. Suitable packing, gaskets or O-rings (not shown), are provided between the valve stem 24 and the bonnet 18 in a variety of arrangements to prevent any fluid leakage from the valve. Valve core 28 is the working member which serves to close and open the valve 10 and, according to its position, to either permit, prevent, or control flow of fluids through the axial openings 30 and 31 of the valve. The valve core 28 as shown in this valve design is rotatable and pivotal in trunnion bushing 32 at its lower end. The rotary and pivotal movement of the valve shown is accomplished through the combined rotary and linear movement of valve stem 24 with particular regard to the cam-like surface 34 relative to follower pins 36 formed as a part of valve core 28. The pivotal movement occurs upon the linear downward movement of stem 24 causing the core to pivot in bushing 32 wherein convexed annular surface 38 engages with the valve seat of this invention generally indicated by the numeral 40. Surface area 38 may be either integrally formed with the valve core 28 or may be a hardened stellite element affixed by welding, etc. Typical of the valve and valve core operation shown in the figure is best described in said prior Pats. 2,076,840; 2,076,841; 2,516,947; and 2,719,022.

The valve seat 40 is preferably formed separately of body 12 and is pressed or shrink fitted into position such that the seating face portion is engageable with the surface 38 of core member 28. The valve seat is formed by retaining a ring of dissimilar Bakelite material 80 as used and described herein between fitted and separate stainless steel machine parts comprising inner sleeve 82 and outer sleeve 84. Outer sleeve 84 is provided with a peripheral end groove portion 86. In the assembly and manufacture the Bakelite ring 80 of substantially rectangular cross-section is pressed into place by the fit of preformed sleeves 82 and 84. Thereafter the portion to face the valve core is machined to form dual seating faces 88 and 89, separated by annular grove 90. The faces extend slightly beyond arcuate surfaces 91 and 92 of the respective sleeves 82 and 84. Suitable conduits 96, at least one, are drilled to provide communication from the groove 90 to the end groove 86 and the space between the valve body and valve seat.

Formed in the valve bdoy 12 is a bleed opening 70 which communicates peripheral space 86 of the valve seat when in position to a bleed line 72 and valve 74.

Older valves can be accommodated to receive the valve seat of this invention merely by providing an opening 70 for the bleed line.

In use, valve seat 40 is sealably fitted into place as provided within valve body 12 so as to expose arcuate seating faces 88 and 89 thereof to valve core 28 and in particular, its mating surface 38. The movement of the valve core as heretofore described provides radial surface contact between surface 38 and seating faces 88 and 89.

An important use of this invention lies in the configuration of the valve seat for utilization in a block and bleed flow system as heretofore described. That is, when the valve of this invention is in the closed or seated position, as has almost occurred in the drawing, any product fluid valve seat leakage, from wear or other means, beyond the seating engagement of either surface 88 or 89 will be directed into the groove 90 and thence to bleed outlet conduit 72 as controlled by a valve 74. Similarly, leakage through axial passageway 31, bypassing the normally seated surface 38 with seating faces 88 and 89, will bypass into the bleed system as described.

Although this invention has been described with a certain degree of particularity, it is manifest that many other changes may be made in the details of construction of usage without departing from the spirit and scope of this disclosure.

What is claimed:
1. A block and bleed valve comprising:
   a valve body having a passageway therethrough;
   a valve core;
   a valve seat;
   means to move said core away from or into engagement with said seat to respectively open or close said passageway;
   said seat comprising:
      an outer metallic sleeve member, an inner metallic sleeve member and an insert ring of Bakelite material assembled to form an integral ring portion,
      said sleeve members and said insert formed to define a seating face,
      a normally open shallow grove in said face of said insert leaving said insert face exposed on both sides thereof said groove,
      a second normally open groove in the outer periphery of said outer or inner sleeve, and
      at least one normally open bleed conduit communicating from said normally open shallow groove to said second normally open groove; and
      a controllable flow conduit means in said valve body providing communication between said shallow groove and the exterior of said valve body.

2. A block and bleed valve according to claim 1 including:
   seal means between said outer sleeve member and said valve body and
   a seal means between said inner sleeve member and said body to seal each side of said normally open groove.

References Cited

UNITED STATES PATENTS

| | | | |
|---|---|---|---|
| 1,960,335 | 5/1934 | Finnie | 251—368 X |
| 3,050,077 | 8/1962 | Wheatley | 137—312 |
| 3,131,906 | 5/1964 | King | 251—315 X |
| 3,306,315 | 2/1967 | Cook | 137—246.22 |

WILLIAM F. O'DEA, Primary Examiner

R. GERARD, Assistant Examiner